United States Patent
Shand (10) Patent No.: US 7,277,814 B1
(45) Date of Patent: Oct. 2, 2007

(54) PORTABLE DIAGNOSTIC HANDSET

(75) Inventor: Arthur M. Shand, Big Canoe, GA (US)

(73) Assignee: AT&T BLS Intellectual Property, Inc., Wilmington, DE (US)

( * ) Notice: Subject to any disclaimer, the term of this patent is extended or adjusted under 35 U.S.C. 154(b) by 960 days.

(21) Appl. No.: 10/075,179

(22) Filed: Feb. 14, 2002

(51) Int. Cl.
G06F 17/30 (2006.01)
(52) U.S. Cl. ......................................... 702/122; 707/10
(58) Field of Classification Search ................ 702/122; 701/29, 33, 1; 340/438, 443, 449, 825.72; 607/59; 707/10
See application file for complete search history.

(56) References Cited

U.S. PATENT DOCUMENTS

| | | | |
|---|---|---|---|
| 6,418,346 B1 * | 7/2002 | Nelson et al. ................. | 607/59 |
| 6,539,384 B1 * | 3/2003 | Zellner et al. ................. | 707/10 |
| 7,092,947 B2 * | 8/2006 | Zellner et al. ................. | 707/10 |
| 2004/0130442 A1 * | 7/2004 | Breed et al. ................. | 340/443 |
| 2005/0046584 A1 * | 3/2005 | Breed ..................... | 340/825.72 |
| 2005/0065678 A1 * | 3/2005 | Smith et al. .................. | 701/29 |

* cited by examiner

*Primary Examiner*—Michael P. Nghiem
*Assistant Examiner*—Hien Vo
(74) *Attorney, Agent, or Firm*—Merchant & Gould (57) ABSTRACT

A portable diagnostic device. The portable diagnostic device includes a housing, a processor located within the housing, an input device located on the housing and coupled to the processor, and a display screen located on the housing and coupled to the processor. The processor includes a microbrowser module configured for communicating with an external source of information and a diagnostic module configured for analyzing information received from the external source of information.

20 Claims, 5 Drawing Sheets

PORTABLE DIAGNOSTIC HANDSET

BACKGROUND OF INVENTION

1. Field of Invention

The present invention is directed generally to diagnostic devices, and, more particularly, to a portable diagnostic device for trouble-shooting a WAP network.

2. Description of the Background

People have come to expect reliable service from their telecommunications provider. For telecommunications occurring over a traditional pair of copper conductor telephone lines, the ability to maintain, monitor, and trouble-shoot each subscriber's telephone line as well as other circuit elements present in the associated Public Switched Telephone Network (PSTN) or Plain Old Telephone System (POTS) allows the telecommunications provider to deliver reliable service to its customers. For wireless telecommunications, the ability to maintain, monitor, and trouble-shoot the hardware and software associated with the wireless network allows the wireless telecommunications provider to deliver reliable service to its customers. Traditional and wireless telecommunications providers each utilize an extensive array of diagnostic tools and procedures to optimize the level of reliability experienced by their respective customers. One example of a tool regularly used to trouble-shoot a service problem being experienced by a customer is a lineman's handset, commonly referred to as a butt set or test set. The lineman's handset is a portable device that may be used by a field technician to test a particular phone line for compliance with performance standards relating to items such as dial tone reception, proper ringing signals, and noise levels.

With the advent of the Wireless Application Protocol (WAP), a significant number of people are now able to access Internet content via wireless devices known as WAP-enabled devices. Wireless Application Protocol (WAP) is an application environment and a set of communication protocols for wireless devices designed to enable a user to request and receive content from the Internet, and the event of requesting and receiving content from the Internet via a WAP-enabled device is referred to as a WAP session.

A wide range of handset manufacturers already support WAP, allowing users to choose from a diverse range of WAP-enabled devices. A WAP-enabled device includes a microbrowser that is utilized to request and receive content from the Internet, and typically has an external appearance similar to that of a wireless phone. To initiate a WAP session, the WAP-enabled device transmits a request for Internet content through a wireless network to a WAP gateway, which is the interface between the wireless network and the Internet. Once the requested content has been retrieved from the Internet, the WAP gateway converts the content into a form suitable for transmission to the WAP-enabled device. The microbrowser within the WAP-enabled device interprets the converted content and displays the content on a display of the WAP-enabled device.

In view of the foregoing, it is apparent that accessing content from the Internet via a mobile WAP-enabled device requires a network that includes a mobile communication network and a data network. This type of network is referred to as a WAP network. Although there are portable diagnostic handsets that can be utilized by a network engineer to trouble-shoot the mobile communication network of the WAP network, these devices are not capable of trouble-shooting the data network of the WAP network.

Thus, there exists a need for a portable diagnostic handset that overcomes the limitations, shortcomings, and disadvantages of known portable diagnostic handsets, and may be utilized to trouble-shoot the mobile communication network and the data network of a WAP network.

BRIEF SUMMARY OF THE INVENTION

The present invention meets the identified need, as well as other needs, as will be more fully understood following a review of this specification and the accompanying drawings. The present invention is directed to a portable diagnostic device for trouble-shooting a WAP network. According to one embodiment, the portable diagnostic device includes a housing, a processor located within the housing, an input device located on the housing and coupled to the processor, and a display screen located on the housing and coupled to the processor. The processor includes a microbrowser module configured for communicating with an external source of information and a diagnostic module configured for analyzing information received from the external source of information.

BRIEF DESCRIPTION OF THE DRAWINGS

For the present invention to be clearly understood and readily practiced, the present invention will be described in conjunction with the following figures, wherein.

DETAILED DESCRIPTION OF THE INVENTION

Figure 1:
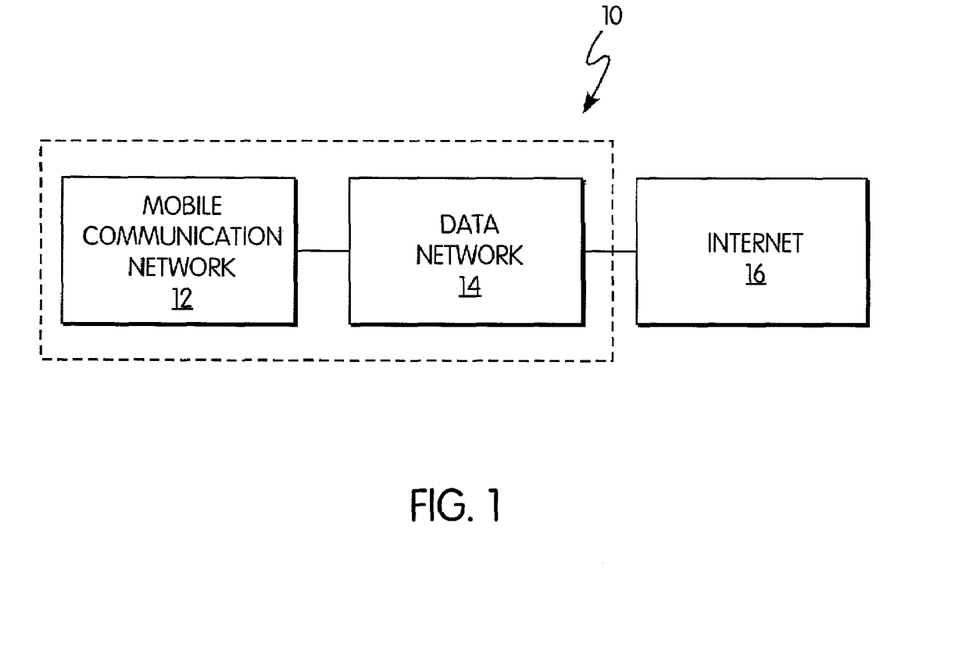
FIG. 1 illustrates a high-level block diagram of a WAP network.

FIG. 1 illustrates a simplified block diagram of a WAP network 10. The WAP network 10 includes a mobile communication network 12 and a data network 14 configured for communication with the mobile communication network 12 and the Internet 16.

Figure 2:
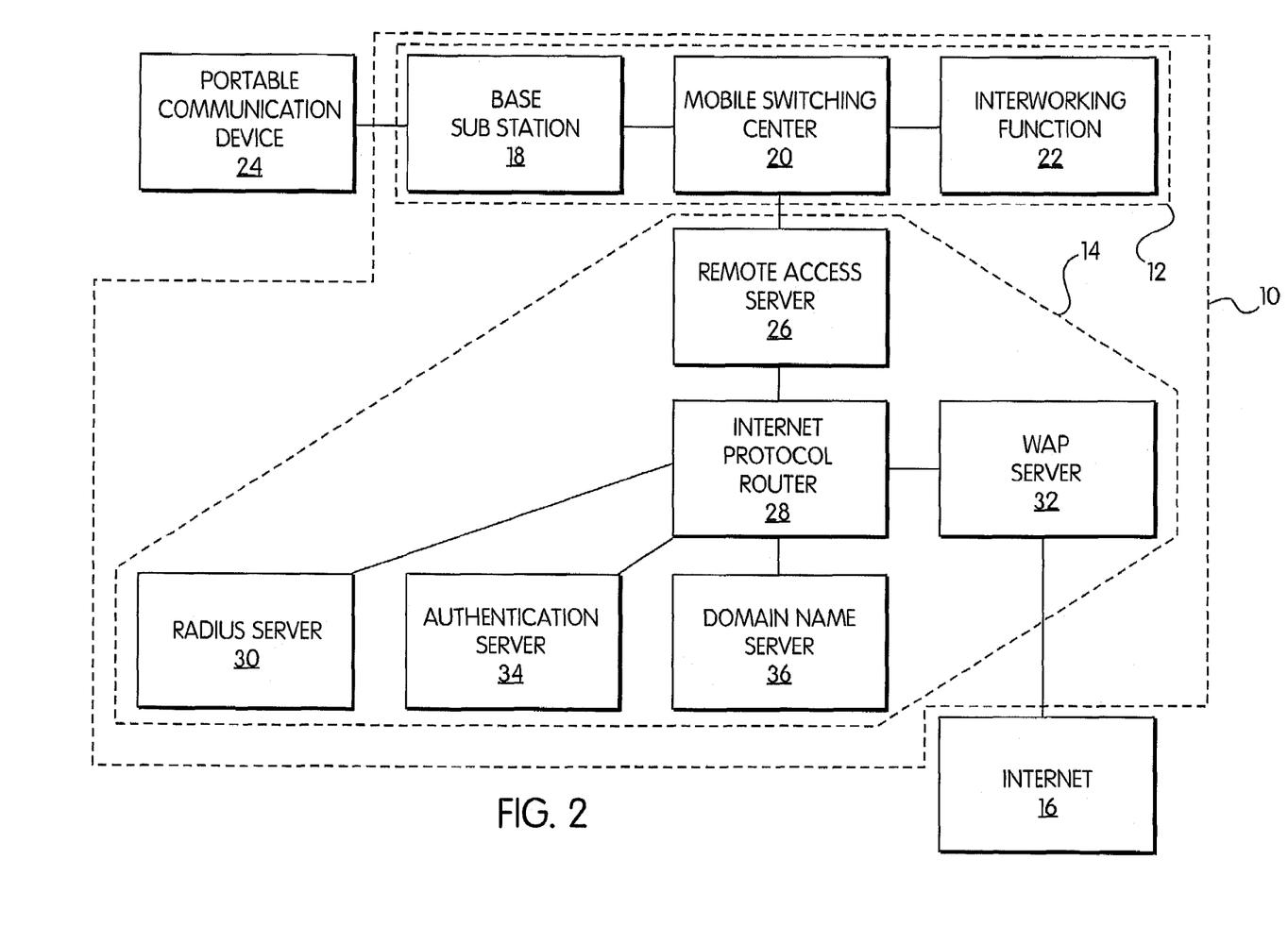
FIG. 2 illustrates one embodiment of the WAP network of FIG. 1.

FIG. 2 illustrates one embodiment of the WAP network 10 of FIG. 1. According to this embodiment, the mobile communication network 12 may include a base substation 18, a mobile switching center 20, and an interworking function 22. According to another embodiment, the mobile communication network 12 may include a plurality of base substations 18 and a plurality of mobile switching centers 20.

The base substation 18 may be configured for communication with a portable communication device 24 such as, for example, a WAP-enabled device and may include the tower, antennas, cables, RF transceivers, power supplies, and controller systems used to enable wireless communications. The mobile switching center 20 may be configured for communication with the base substation 18 and may include an automatic switching system that coordinates the establishment of calls to and from the portable communication device 24. The interworking function 22 may be configured for communication with the mobile switching center 20 and may include a modem pool used to establish a circuit-switched data connection between the portable communication device 24 and the data network 14 via the mobile switching center 20. The interworking function 22 may be implemented by a PCU (Packet Control Unit) available from companies such as, for example, Ericsson, Nokia, or Nortel.

The data network 14 may include a remote access server 26, an IP (Internet Protocol) router 28, a RADIUS (Remote Access Dial-In User Services) server 30, a WAP server 32, an authentication server 34, and a domain name server 36.

The remote access server 26 may be configured for communication with the mobile switching center 20 and for receipt of a circuit switched data call originated in the portable communication device 24. The remote access server 26 may assign a temporary IP address to the portable communication device 24 and may generate a serial TCP/IP data stream associated with the circuit switched data call. According to one embodiment, the remote access server 26 may be implemented in the form of a CISCO 5300 remote access concentrator.

The IP router 28 may be configured for communication with the remote access server 26 and is a protocol sensitive switching device that may be used to direct IP traffic in and out of a number of other WAP network elements such as the remote access server 26, the RADIUS server 30, the WAP server 32, the authentication server 34, and the domain name server 36. According to one embodiment, the IP router 28 may be implemented as a CISCO model 3640 router.

The RADIUS server 30 may be configured for communication with the remote access server 26 via the IP router 28, and may include a database populated with the IP address and identification information associated with the portable communication device 24. According to one embodiment, the RADIUS server 30 may be implemented by a Sun Netra T1 server.

The WAP server 32 may be configured for communication with remote access server 26 and the Internet 16 via the IP router 28, and may function as the physical interface between the data network 14 and the Internet 16. According to one embodiment, the WAP server 32 may be implemented as an Openwave Mobile Access Gateway. The WAP server 32 may retrieve Internet content and forward the content to the portable communication device 24 via the IP router 28 and the mobile communication network 12. Due to size constraints associated with the display of a typical portable communication device 24, the WAP server 32 may convert the Internet content into a format suitable for display on the portable communication device 24 prior to forwarding the content to the portable communication device 24. Thus, the WAP server 32 may be thought of as serving as a WAP gateway for the WAP network 10 of FIG. 2. The WAP server 32 may also be responsible for functions such as user provisioning, user database creation and maintenance, bi-directional security, traffic control, and call detail recording (CDR) generation.

The authentication server 34 may be configured for communication with the WAP server 32 via the IP router 28, and may include a subscriber database that may be used to authenticate a user of the portable communication device 24 for purposes of conducting a WAP session. According to one embodiment, the authentification server 34 may be implemented as a Sun Netra T1 server.

The domain name server 36 may be configured for communication with the WAP server 32 via the IP router 28, and may include a database that stores tables of both domain names and IP addresses. According to one embodiment, the domain name server 36 may be implemented as Sun Netra T1 server. When a domain name is entered at the portable communication device 24 in the form of a universal resource locator (URL), the textual representation of a web site address, the domain name server 36 may translate the universal resource locator into an IP address associated with a web site, and forward the IP address to the WAP server 32 via the IP router 28.

It is to be appreciated by one skilled in the art that the WAP network 10 of FIG. 1 may also include a number of other network elements not shown in FIG. 2. For example, the WAP network 10 of FIG. 1 may also include network elements such as short message service centers, e-mail servers, and firewalls.

Figure 3A:
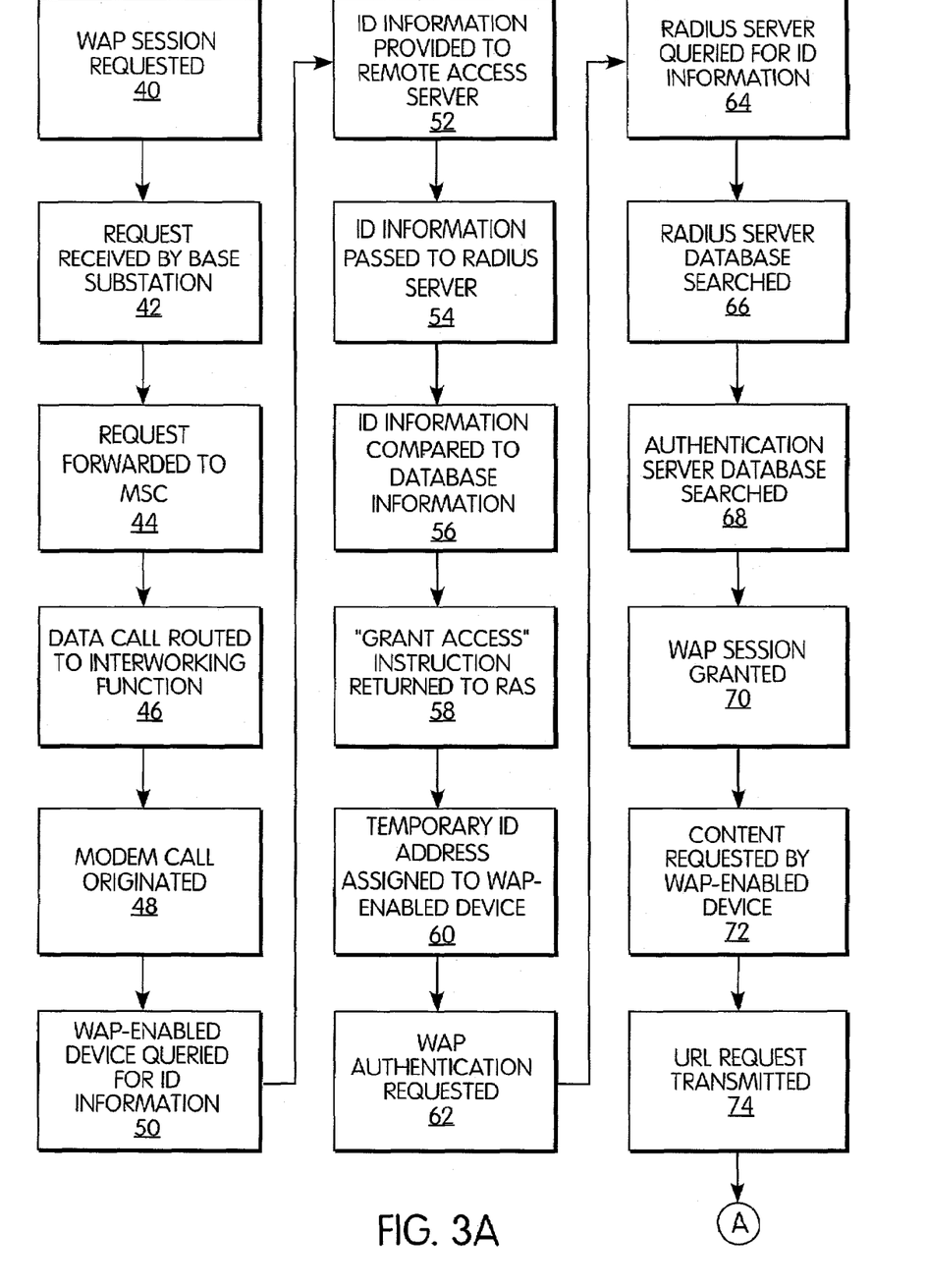
FIGS. 3A and 3B illustrate an embodiment of a process flow for conducting a WAP session utilizing the WAP network of FIG. 2.
Figure 3B:
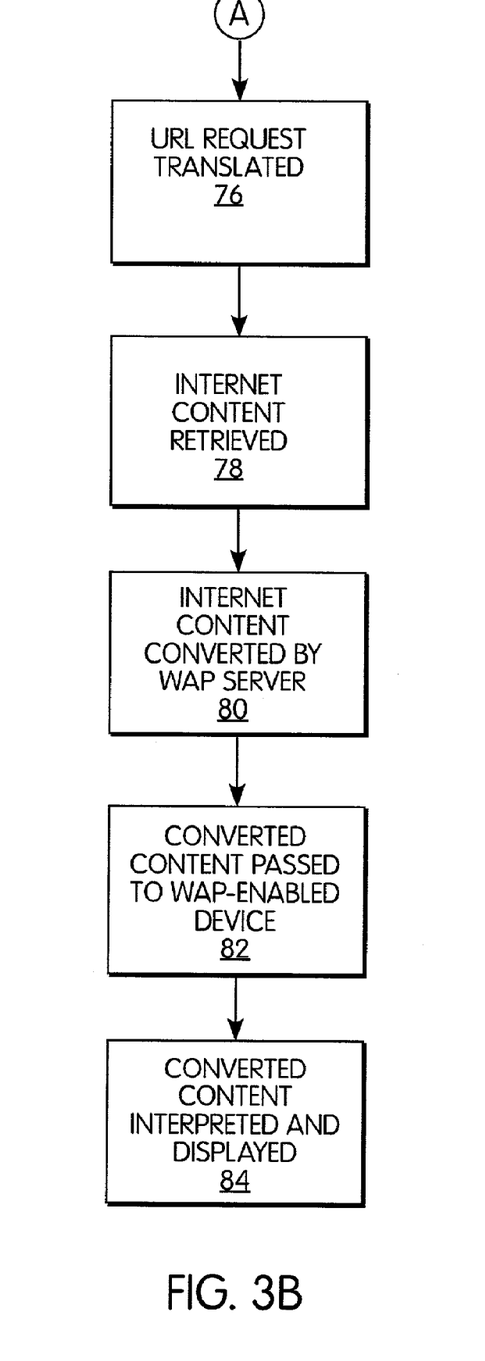

FIGS. 3A and 3B illustrate a process flow for conducting a WAP session utilizing the WAP network of FIG. 2. According to this embodiment, the portable communication device 24 described hereinabove is a WAP-enabled device having a keypad and a display screen.

The process begins at block 40, where a request to conduct a WAP session is initiated at the WAP-enabled device 24. The WAP request may be initiated by, for example, accessing a menu displayed on the display screen of the WAP-enabled device 24, selecting an "access Internet" option on the menu, and pressing an "OK" key on the keypad of the WAP-enabled device 24. In response to the execution of the above-described sequence of steps, the WAP-enabled device 24 dials a phone number associated with a data call and transmits the call over the air.

From block 40, the process proceeds to block 42, where the transmitted request is received by the base substation 18. From block 42, the process proceeds to block 44, where the base substation 18 forwards the request to the mobile switching center 20. From block 44, the process proceeds to block 46, where, based on the number dialed by the WAP-enabled device 24, the mobile switching center 20 recognizes that the call is a data call and routes the data call to the interworking function 22. From block 46, the process proceeds to block 48, where the inter-working function 22 receives the data call and originates an Integrated Services Digital Network/Unrestricted Digital Information modem call back through the mobile switching center 20 and out a dedicated WAP trunk group to the remote access server 26.

From block 48, the process proceeds to block 50, where the remote access server 26 receives the Integrated Services Digital Network/Unrestricted Digital Information modem call and queries the WAP-enabled device 24 for identification information via the mobile switching center 20 and the base substation 18. Such identification information may include, for example, the mobile station ISDN number associated with the WAP-enabled device. From block 50, the process proceeds to block 52, where, in response to the query generated at block 50, the WAP-enabled device 24 provides identification information to the remote access server 26 via the base substation 18 and the mobile switching center 20. From block 52, the process proceeds to block 54, where the remote access server 26 receives the identification information from the WAP-enabled device 24 and passes the identification information to the RADIUS server 30.

From block 54, the process proceeds to block 56, where the RADIUS server 30 receives the identification information and compares the received identification information to identification information contained in a database maintained by the RADIUS server 30. If the identification information provided by the WAP-enabled device 24 corresponds to identification information associated with a valid WAP-enabled device 24, the process proceeds from block 56 to block 58, where the RADIUS server 30 returns a "grant access" instruction to the remote access server 26, thus establishing a connection between the WAP-enabled device 24 and the remote access server 26. From block 58, the process proceeds to block 60, where the remote access server 26 assigns a temporary IP address to the WAP-enabled device 24 for WAP session management purposes and grants the WAP-enabled device 24 access to the WAP server 32.

Once the path between the WAP-enabled device 24 and the WAP server 32 is established, the process proceeds from block 60 to block 62, where the WAP server 32 transmits a request for WAP authentication to the authentication server 34 via the IP router 28. The request for WAP authentication is essentially a request for verification that the user of the WAP enabled device 24 is a WAP subscriber. From block 62, the process proceeds to block 64, where the authentication server 34 receives the request and queries the RADIUS server 30 via the IP router 28 for client information associated with the IP address assigned to the WAP-enabled device 24. The client information may be contained in a database maintained by the RADIUS server 30, and may include, for example, the client's user name and password. From block 64, the process proceeds to block 66, where the RADIUS server receives the request and, based on the IP address assigned to the WAP-enabled device 24, searches a database maintained by the RADIUS server 30 for the requested client information, and passes the client information to the authentication server 34 via the IP router 28. From block 66, the process proceeds to block 68, where the authentication server 34 receives the client information from the RADIUS server 30, and searches a database maintained by the authentication server 34 for an entry that corresponds to the client information received from the RADIUS server 30. If a corresponding entry is found, the user is considered authenticated and the process proceeds from block 68 to block 70, where the authentication server 34 returns a "grant WAP session" instruction to the WAP server 32, thus permitting the WAP-enabled device 24 to access content on the Internet via the WAP server 32.

Once the WAP-enabled device 24 has been authorized to conduct a WAP session, the process proceeds from block 70 to block 72, where a request for content associated with a particular web site on the Internet may be transmitted from the WAP-enabled device 24. To request content from a specific web site, a textual representation of the web site may be entered from the keypad of the WAP-enabled device 24. A microbrowser in the WAP-enabled device 24 then converts the textual representation into a universal resource locator (URL) request that may be transmitted over the air. From block 72, the process proceeds to block 74, where the URL request is received by the base substation 18 and is passed to the domain name server 36 via the mobile communication network 12 and the IP router 28.

From block 74, the process proceeds to block 76, where the domain name server 36 receives the URL request and translates the URL request into the IP address associated with an applications server (not shown) connected to the Internet that contains the requested content, and forwards the IP address to the WAP server 32 via the IP router 28. From block 76, the process proceeds to block 78, where the WAP server 32 receives the IP address associated with the requested content, and accesses the applications server (not shown) via the Internet to retrieve the content requested by the WAP-enabled device 24. Once the content has been retrieved from the applications server (not shown) by the WAP server 32, the process proceeds from block 78 to block 80, where the WAP server 32 converts the content into a compact binary form suitable for transmission to the WAP-enabled device 24. From block 80, the process proceeds to block 82, where the WAP server 32 passes the converted content to the WAP-enabled device 24 via the mobile communication network 12. From block 82, the process proceeds to block 84, where the converted content is interpreted by the microbrowser of the WAP-enabled device 24, and displayed on the display screen of the WAP-enabled device 24.

Figure 4:
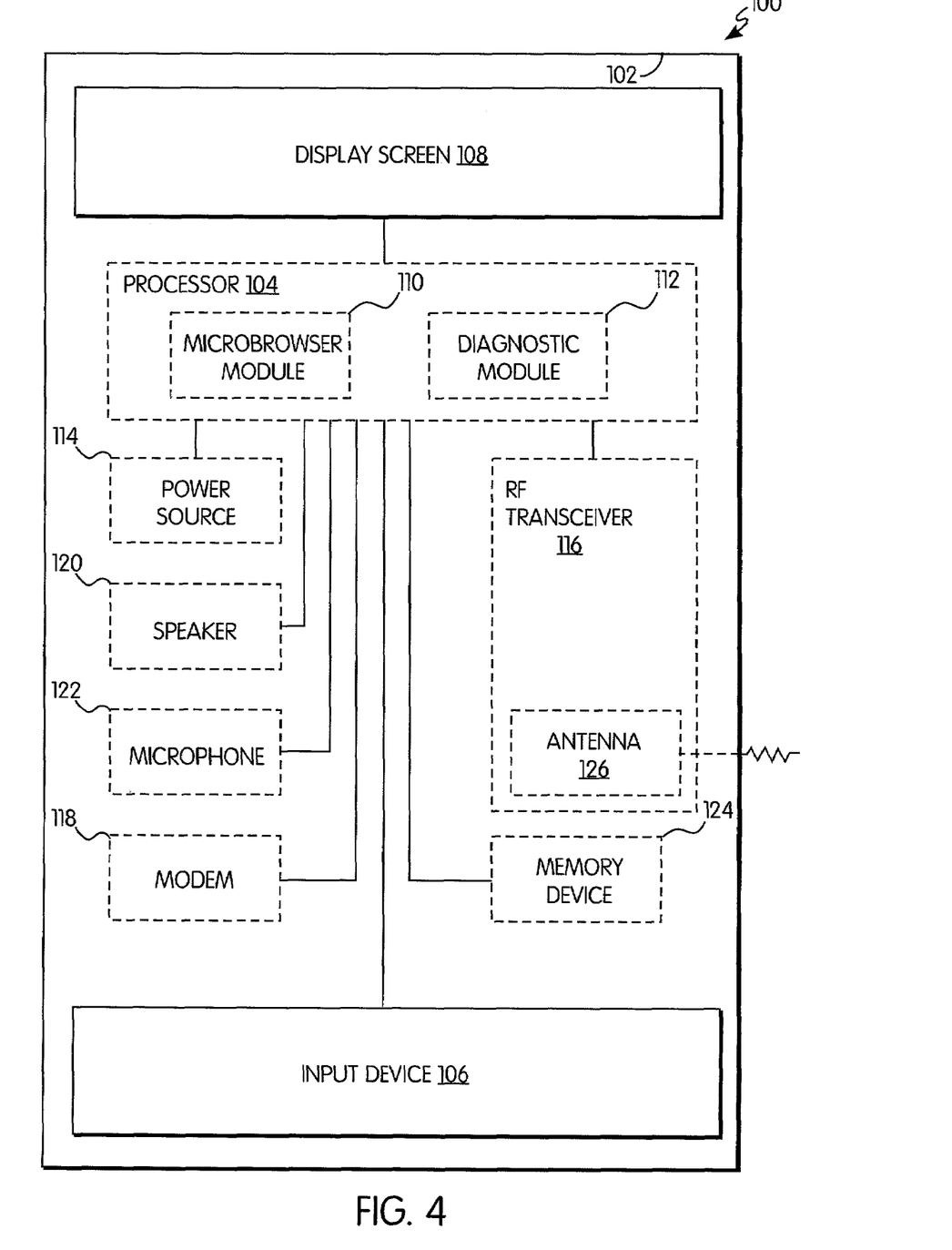
FIG. 4 illustrates a block diagram of an embodiment of a portable diagnostic device for troubleshooting the WAP network of FIG. 2.

FIG. 4 illustrates an exemplary block diagram of a portable diagnostic device 100 for trouble-shooting a WAP network 10 such as, for example, the WAP network 10 of FIG. 2. The portable diagnostic device 100 may be a WAP-enabled device and may include a housing 102, a processor 104, an input device 106, and a display screen 108.

The housing 102 encloses the electronic circuitry and certain other components (described in more detail hereinbelow) required to operate the portable diagnostic device 100. The housing 102 may be manufactured using a lightweight, shock-absorbent, water-resistant material suitable for the typical rigors that a portable device may be subjected to. For example, the housing 102 may be manufactured from ABS (Acrylonitrile Butadiene Styrene) plastic.

The processor 104 is located within the housing 102 and may be a central processing unit (CPU) including, e.g., a microprocessor, an application specific integrated circuit (ASIC), or one or more printed circuit boards. The processor 104 may include a microbrowser module 110 and a diagnostic module 112, and will be described in more detail hereinbelow. The microbrowser module 110 is configured for communicating with an external source of information such as, for example, a network element of the WAP network 10 or a server (not shown) connected to the Internet 16, and may be configured to "read" information received in the WML (Wireless Mark-up language) and WMLScript formats used to transmit content to a WAP-enabled device. The microbrowser module 110 may request and receive specific information from the external source of information. The specific information may include, for example, the status of the network elements of the WAP network 10, a base substation ID, a signal level associated with the base substation 18, a mobile switching center ID, a mobile switching center port number and circuit number that received a particular WAP subscriber's data call, the time frame of the WAP subscriber's last WAP session, the modem ID of the inter working function modem that originated the Integrated Services Digital Network/Unrestricted Digital Information modem call, the remote access server port number and circuit number over which a connection with the WAP-enabled device 24 was established, the IP address assigned to the WAP-enabled device 24, the IP router port number over which a connection to the WAP server 32 was established for a subscriber's WAP session, the IP address generated by the domain name server 36, and the WAP server port number over which a connection to the Internet was established. Such information may be received directly from the network elements or from other remotely-located sources of information. For example, the network elements may be "pinged" to determine their connectivity status, or information associated with the network elements may be received from a remotely-located server (not shown) connected to the Internet that stores network element operational data retrieved by a logging program that continuously pulls operational data from the network elements.

The diagnostic module 112 is configured for analyzing the information received by the microbrowser module 110. From the foregoing, it is apparent that conducting a WAP session requires the error-free operation of a plurality of devices and the links between those devices. If a WAP subscriber experiences difficulty while conducting or while attempting to conduct a WAP session, the analysis provided by the diagnostic module 112 may assist a network engineer in identifying the potential source of the difficulty. According to one embodiment, the diagnostic module 112 may be configured to analyze information received by the microbrowser module 110 that is associated with elements of the WAP network 10 in a predetermined sequence such as, for example, a sequence that that mirrors the sequence of the process flow described hereinabove with respect to FIG. 3. For example, after analyzing the information associated with the base substation 18, the diagnostic module 112 may then analyze the information associated with the mobile switching center 20, followed by analyzing the information associated with the interworking function 22, and so on. By analyzing information associated with each element of the WAP network 10 in a sequence, for example, that mirrors the process flow of FIG. 3, the network engineer may utilize the analysis provided by the diagnostic module 112 to sequentially eliminate certain elements of the WAP network 10 as the source of the difficulty, and possibly identify the specific source of the difficulty.

The modules 110, 112 may be implemented as microcode configured into the logic of the processor 104, or may be implemented as programmable microcode stored in an electrically erasable programmable read only memory (EEPROM). According to another embodiment, the modules 110, 112 may be implemented as software code to be executed by the processor 104. The software code may be written in any suitable programming language using any suitable programming technique. For example, the software code may be written in C using procedural programming techniques, or in Java or C++ using object oriented programming techniques. The software code may be stored as a series of instructions or commands on a computer readable medium, such as a random access memory (RAM) or a read only memory (ROM), a magnetic medium such as a harddrive or a floppy disk, or an optical medium such as a CD-ROM.

The input device 106 is located on the housing 102 and is coupled to the processor 104. The input device 106 may be any suitable input device such as, for example, a keypad, a mouse, or a trackball. According to one embodiment, the input device 106 is a keypad located on the housing 102 and includes keys for digits '0' through '9', for symbols '*' and '#', and for functions such as Internet access, data retrieval from local memory, data transmission, etc. The keys on the keypad may be, for example, push-button keys, membrane keys or touch-pad keys. According to another embodiment, the input device 106 may also include an electronic pointing device, e.g., a track ball or a touch-pad mouse (not shown), to allow a network engineer using the portable diagnostic device 100 to quickly and efficiently access various functions performed by the portable diagnostic device 100. In this embodiment, various menu options may be displayed in letter-form (e.g., 'NETWORK TEST', 'ACCESS INTERNET', etc.) with or without appropriate icons on the display screen 108, and the network engineer may select the desired function to be performed by using the electronic pointing device.

The display screen 108 is located on the housing 102 and is coupled to the processor 104. The display screen 108 may be used to display textual and/or graphical information pertaining to operation parameters of the WAP network 10 and may be, for example, an LCD (Liquid Crystal Display) screen, a passive matrix display or a TFT (Thin Film Transistor) active matrix display. According to one embodiment, the display screen 108 may be touch-sensitive and many or all of the functions performed using the input device 106 may be performed by touching appropriate locations on the display screen 108. In this embodiment, the input device 106 may, for example, have a reduced number of keys thereon or, if desired, the input device 106 may be eliminated altogether from the housing 102.

The portable diagnostic device 100 may also include a power source 114, a radio frequency transceiver 116, a modem 118, a speaker 120, a microphone 122, and a memory device 124.

The power source 114 is located within the housing 102 and is coupled to the processor 108. The power source 114 may supply the requisite power to various electronic circuit elements located within the housing 102, and may be implemented by, for example, a rechargeable battery.

The radio frequency transceiver 116 is located within the housing 102 and is coupled to the processor 108. The radio frequency transceiver 116 may transmit information to the mobile communication network 12 and may receive information from the mobile communication network 12, and may include an antenna 126 originating within the housing 102 and protruding therefrom.

The modem 118 is located within the housing 102 and is coupled to the processor 108. The modem 118 may modulate information received via the processor 108 prior to forwarding to the radio frequency transceiver 116 for over-the-air transmittal to the mobile communication network 12, and may demodulate information received from the mobile communication network 12 via the radio frequency transceiver 116 prior to forwarding to the information to the processor 108. The modem 118 may employ one or more of a number of modulation schemes such as, for example, BASK (binary amplitude shift keying), FSK (frequency shift keying), DQPSK (differential quadrature phase shift keying), QAM (quadrature amplitude modulation) and TCM (trellis-coded modulation). The modem 118 may function in a full duplex communication mode allowing simultaneous transmission and reception of electrical signals. The modem 118 may also perform error correction for transmitted and received data. The data communication speed of the modem 118 may be, for example, 56 kbps (kilobits per second) with automatic fall-back capability in the event of noisy line conditions or due to a mismatch between the data communication speeds of the modem 118 and the device with which the modem 118 is communicating.

The speaker 120 and the microphone 122 are located within the housing 102 and are coupled to the processor 108. The speaker 120 may be any type of speaker suitable for converting an electronic signal into an audible sound and the microphone 122 may be any type of microphone suitable for converting a sound wave into an electronic signal. A network engineer may utilize the speaker 120 to listen to various tones, noise, and other signals to trouble-shoot the mobile communication network 12 of the WAP network 10, and may utilize the microphone 122 to speak to other technicians such as, for example, an office-based technician.

The memory device 124 is located within the housing 102 and is coupled to the processor 108. The memory device 124 may include memory for storage of data such as, for example, data received from the Internet 16 via the data network 14 and the mobile communication network 12. The memory device 118 may include volatile and/or non-volatile memory, such as a RAM (Random Access Memory), a ROM (Read Only Memory), an EEPROM (Electrically Erasable Programmable Read Only Memory), flash memory, or other similar memory units.

Although the present invention has been described and illustrated in detail herein with respect to certain embodiments, it is clearly understood that the same is by way of example and is not to be taken by way of limitation. For example, the portable diagnostic device 100 described hereinbefore may be configured to trouble-shoot any WAP network, not just the WAP network 10 of FIG. 2. It will be appreciated by those of ordinary skill in the art that numerous modifications and variations of the present invention may be implemented without departing from the spirit and scope of the present invention as described in the appended claims.

What is claimed is:

1. A portable WAP-enabled diagnostic device for troubleshooting a WAP network having a plurality of elements, the diagnostic device, comprising:
   a housing;
   a processor located within the housing, wherein the processor includes:
      a microbrowser module configured for communicating with an external source of information including a WAP network undergoing troubleshooting; and
      a diagnostic module configured for analyzing information associated with elements of the WAP network in a predetermined sequence configured to emulate a sequence of a process flow of signals through the elements of the WAP network undergoing diagnosis by the portable diagnostic device;
   an input device located on the housing and coupled to the processor; and
   a display screen located on the housing and coupled to the processor to display information pertaining to operating parameters of the WAP network undergoing diagnoses.

2. The portable diagnostic device of claim 1, wherein the WAP network includes a mobile communication network in selective communication with a data network configured for communication with the mobile communication network and the Internet, and the microbrowser is operative for communication with the WAP network.

3. The portable diagnostic device of claim 2, wherein the mobile communication network includes a device selected from the group of devices consisting of a base substation, a mobile switching center, an interworking function, and a remote access server.

4. The portable diagnostic device of claim 2, wherein the data network includes a device selected from the group of devices consisting of an Internet protocol router, a remote access dial-in user services server, a WAP server, an authentication server, and a domain name server.

5. The portable diagnostic device of claim 1, wherein the external source of information includes a server connected to the Internet.

6. The portable diagnostic device of claim 1, wherein the input device includes an input device selected from the group consisting of a keypad, a mouse, a trackball, and a touch screen.

7. The portable diagnostic device of claim 1, wherein the display screen includes a display screen selected from the group consisting of an LCD display screen, a passive matrix display screen, and a TFT active matrix display screen.

8. The portable diagnostic device of claim 1, further comprising a power source located within the housing and coupled to the processor.

9. The portable diagnostic device of claim 1, further comprising a radio frequency transceiver located within the housing and coupled to the processor.

10. The portable diagnostic device of claim 9, wherein the radio frequency transceiver includes an antenna originating within the housing and protruding therefrom.

11. The portable diagnostic device of claim 1, further comprising a modem located within the housing and coupled to the processor.

12. The portable diagnostic device of claim 1, further comprising a speaker located within the housing and coupled to the processor.

13. The portable diagnostic device of claim 1, further comprising a microphone located within the housing and coupled to the processor.

14. The portable diagnostic device of claim 1, further comprising a memory device located within the housing and coupled to the processor.

15. The portable diagnostic device of claim 14, wherein the memory device includes a volatile memory.

16. The portable diagnostic device of claim 15, wherein the volatile memory includes a random access memory.

17. The portable diagnostic device of claim 14, wherein the memory device includes a non-volatile memory.

18. The portable diagnostic device of claim 17, wherein the non-volatile memory includes an electrically erasable programmable read only memory.

19. A computer-readable medium having stored thereon a set of instructions which, when executed by a processor, cause the processor to:
   request information from an external source associated with an element of a WAP network;
   receive the requested information from the external source element of the WAP network; and
   analyze the received information in a predetermined sequence to emulate a process flow of signals through elements of the WAP network for diagnosis of the WAP network.

20. The computer-readable medium of claim 19, wherein receiving the requested information from an element of the WAP network includes receiving the requested information from an element of the WAP network via a server connected to the Internet.

* * * * *